United States Patent [19]

Sterman et al.

[11] Patent Number: 5,187,259

[45] Date of Patent: Feb. 16, 1993

[54] CHAIN EXTENDED GELATIN

[75] Inventors: Melvin D. Sterman, Pittsford; James L. Bello, Rochester, both of N.Y.

[73] Assignee: Eastman Kodak Company, Rochester, N.Y.

[21] Appl. No.: 612,370

[22] Filed: Nov. 14, 1990

[51] Int. Cl.$^5$ ............... C07K 15/06; C07K 15/20; C09D 189/00; G03C 1/047
[52] U.S. Cl. ..................... 530/354; 106/125; 430/539; 430/640; 430/642; 530/355; 530/408
[58] Field of Search ............... 106/125; 530/354, 355, 530/408; 430/537, 539, 640, 642

[56] References Cited

U.S. PATENT DOCUMENTS

| | | | |
|---|---|---|---|
| Re. 29,305 | 7/1977 | Burness et al. | 430/415 |
| 2,652,345 | 9/1953 | Jones | 427/384 |
| 2,726,162 | 12/1955 | Allen et al. | 106/125 |
| 2,816,125 | 12/1957 | Allen et al. | 558/46 |
| 2,992,109 | 6/1961 | Allen | 430/623 |
| 2,996,405 | 7/1961 | Allen | 430/628 |
| 3,061,436 | 10/1962 | Himmelmann et al. | 530/354 |
| 3,171,831 | 3/1965 | William | 430/642 |
| 3,312,945 | 5/1964 | Ryan | 430/628 |
| 3,345,177 | 10/1967 | Wilson | 430/621 |
| 3,360,372 | 12/1967 | Burness et al. | 430/621 |
| 3,392,024 | 7/1968 | Burness | 430/625 |
| 3,490,911 | 1/1970 | Burness et al. | 430/543 |
| 3,497,358 | 2/1970 | Sieg et al. | 430/621 |
| 3,539,644 | 11/1970 | Burness et al. | 430/451 |
| 3,640,720 | 2/1972 | Cohen | 430/622 |
| 3,642,486 | 2/1972 | Burness et al. | 106/125 |
| 3,642,908 | 2/1972 | Burness et al. | 530/354 |
| 3,689,274 | 9/1972 | Sobel et al. | 530/408 |
| 3,721,564 | 3/1973 | Meyer et al. | 430/543 |
| 3,832,181 | 8/1924 | Dallon et al. | 430/539 |
| 3,834,902 | 9/1974 | Wright | 430/89 |
| 3,841,872 | 10/1974 | Burness et al. | 430/415 |
| 3,850,639 | 11/1974 | Dallon et al. | 430/415 |
| 4,007,163 | 2/1977 | Habu et al. | 430/451 |
| 4,019,906 | 4/1977 | Ridley | 430/539 |
| 4,028,320 | 6/1977 | Sera et al. | 430/524 |
| 4,057,538 | 11/1977 | Habu et al. | 430/451 |
| 4,088,495 | 5/1978 | Habu et al. | 430/623 |
| 4,088,648 | 5/1978 | Smith | 544/387 |
| 4,104,302 | 8/1978 | Kitzing et al. | 430/622 |
| 4,108,848 | 8/1978 | Habu et al. | 530/354 |
| 4,134,765 | 1/1979 | Smith | 430/415 |
| 4,134,770 | 1/1979 | Emoto et al. | 430/543 |
| 4,137,082 | 1/1979 | Ishii et al. | 430/622 |
| 4,142,897 | 3/1979 | Habu et al. | 430/624 |
| 4,161,407 | 7/1979 | Campbell | 430/621 |
| 4,171,976 | 10/1979 | Burness et al. | 106/125 |
| 4,173,481 | 11/1979 | Ishii et al. | 430/621 |
| 4,323,646 | 4/1982 | Bergthaller et al. | 430/622 |
| 4,349,624 | 9/1982 | Bergthaller et al. | 430/622 |
| 4,396,709 | 8/1983 | Ishigami et al. | 430/539 |
| 4,421,847 | 12/1983 | Jung et al. | 530/354 |
| 4,543,324 | 9/1985 | Himmelmann | 430/622 |
| 4,547,445 | 10/1985 | Asahina et al. | 430/22 |
| 4,600,687 | 7/1986 | Hirano et al. | 430/529 |
| 5,071,736 | 12/1991 | Ikenoune et al. | 430/523 |

FOREIGN PATENT DOCUMENTS

| | | |
|---|---|---|
| 0243199 | 10/1987 | European Pat. Off. . |
| 872153 | 5/1953 | Fed. Rep. of Germany . |
| 54-123024 | 9/1979 | Japan . |
| 1397905 | 6/1975 | United Kingdom ... 530/408 |

OTHER PUBLICATIONS

Cohen, "The Production of Photographic Gelatin", PSA Journal, Section B, Aug. 1953, pp. 105–108.
Research Disclosure, Dec. 1978, p. 26.
The Theory of the Photographic Process, T. H. James, 4th Ed., MacMillan, 1977, pp. 77–78.

Primary Examiner—Jeffrey E. Russel
Attorney, Agent, or Firm—Robert A. Gerlach

[57] ABSTRACT

A soluble, chain extended gelatin having a high molecular weight and significantly higher viscosity at equivalent gelatin concentration compared to standard gelatin and significantly faster setting time is produced by preparing an aqueous gelatin composition containing from about 6% to about 18% dry weight of gelatin and from about 0.25 to about 5 millimoles of a bis-(vinyl sulfonyl) compound per 100 grams of gelatin, heating the composition at a temperature of from about 40 to about 60°C. and at a pH of from about 4.5 to about 7 for from about one to about eight hours.

22 Claims, No Drawings

CHAIN EXTENDED GELATIN

FIELD OF THE INVENTION

This invention relates to soluble chain extended gelatin and a method for producing it by which the molecular weight and, hence, viscosity of the gelatin are increased without gel formation.

BACKGROUND OF THE INVENTION

Gelatin has long been known as an emulsion or dispersion base and carrier for dyes and other photographically active materials. For such applications it is important that the cast gelatin layers set as rapidly as possible without detriment to the forming film. In applications such as curtain-coating, a strong correlation exists between the rheology of gelatin and the critical speed for the onset of air entrainment. Highest coating speeds are obtained with coating fluids having the greatest shear thinning behavior. In those applications in which gelatin layers contain silver halide, even when high grade gelatins are employed, sedimentation of the silver halide often occurs before the gelatin layer sets because of the low viscosity of the casting solution.

Attempts to overcome these difficulties and increase the setting speed of gelatin by adding thickeners such as polystyrene sulphonic acid have been unsuccessful since thickeners frequently cause surface defects during casting. Alternatively, the use of hardenable materials to harden photographic gelatin layers chemically and thereby adjust the degree of swelling, increase the melting point, and increase mechanical strength has also been proposed. Unfortunately, hardeners introduce undesirable effects such as defective crystallization, adhesion difficulties, layer separation due to the varying lateral swelling of the individual layers, and other problems which render the material useless. Such problems are exacerbated when casting requirements make it necessary to employ such short drying times and/or such high drying temperatures that the ordered helical structures which develop during gelatin layer formation can only be partially formed.

Many attempts have been made to overcome such difficulties. For example, U.S. Pat. No. 4,421,847 describes a process for chain lengthening gelatin by partial hardening. However, the "partial hardening" referred to is a cross-linking reaction which results in the formation of insolubles and renders the material useless, particularly for photographic applications. Likewise, U.S. Pat. Nos. 3,642,486 and 3,539,644 describe the use of hardening agents to produce higher molecular weight gelatin. The resulting product is gelled and insoluble.

Some have proposed the addition of quickly hardenable materials such as chrome acetate or materials which actuate the hardening reaction of gelatin which otherwise takes place only slowly. For example, U.S. Pat. No. 2,652,345 suggests the addition of formaldehyde and treatment with gaseous ammonia. U.S. Pat. No. 2,996,405 proposes the addition of a mixed styrene-aminomaleic acid polymer and treatment with ammonia vapor. The reaction of gelatin with thiolactones to provide gelatin compositions stable in the acid range but quickly hardenable in alkaline media is described in U.S. Pat. No. 3,171,831. However, high pH values accelerate chemical cross-linking which is disadvantageous in photographic processes and renders the gelatin compositions useless in multilayer materials where crosslinking causes adhesion defects.

In another approach, the yield of higher viscosity, higher molecular weight gelatin obtained from lime processed ossein stock can be substantially increased by controlling the time and temperature of the alkaline extractions. However, significantly lower yields of gelatin and higher amounts of poorer quality gelatin are thus produced, resulting in low gel strength, higher color and lower clarity. Alternatively, the acid processing of ossein yields gelatins which have a much lower viscosity than gelatins obtained by lime processing. Gelatins derived from pigskin are normally obtained by the acid process and have the same low viscosities as acid processed ossein gelatins.

Accordingly, it is important to provide a gelatin having a faster setting time, higher viscosity, and higher molecular weight at the same gelatin concentration while retaining its solubility characteristics.

SUMMARY OF THE INVENTION

A soluble, chain extended gelatin having a high molecular weight and significantly higher viscosity at equivalent gelatin concentration compared to standard gelatin and significantly faster setting time is provided. The soluble gelatin of the invention comprises from about 0.25 to about 5.0 millimoles of a bis-(vinyl sulfonyl) compound, preferably bis-(vinyl sulfonyl) methyl ether or bis-(vinyl sulfonyl) methane, per 100 grams of gelatin. Gelatin percentages are based on the dry weight of gelatin divided by the total solution weight.

The soluble, chain extended gelatin of the invention is produced by a process which comprises preparing a gelatin composition containing from about 6% to about 18% dry weight of gelatin and from about 0.25 to about 5 millimoles of a bis-(vinyl sulfonyl) compound per 100 grams of gelatin, heating the composition at a temperature of from about 40° to about 60° C. and at a pH of from about 4.5 to about 7 for from about one to about eight hours. Chain extended gelatins can be produced from all types of gelatin including lime processed gelatin, acid processed bone gelatin, acid processed pigskin, and the like.

The soluble, chain extended gelatins of the invention are particularly useful on support layers in the production of photographic elements, as carrier layers for microcrystalline dispersed dye in the production of microfilm products, or as carrier layers for conventional and fast acting hardeners in color emulsion products. The chain extended gelatins of the invention are also useful as melt gelatins for a variety of emulsions where higher melt viscosities are either desired or required. They provide significantly smaller particle size in yellow coupler dispersions compared to control dispersions prepared using a standard viscosity gelatin. Casting solutions produced from the gelatins of the invention have an increased setting rate (faster setting time) and significantly increased viscosity and molecular weight for the same gelatin concentration with no insolubles or gel formation. Casting defects and the formation of sediment can thus be avoided as well as the lateral swelling of individual layers which leads to adhesion defects. In curtain coating applications, a strong correlation exists between the rheology of gelatin and the critical speed for the onset of air entrainment. The gelatins of the invention provide the highest coating speeds and exhibit excellent shear thinning behavior in coating fluids in which they are contained.

DETAILED DESCRIPTION OF THE INVENTION

The process of the invention produces higher gelatin solution viscosities without increasing gelatin concentration and without the formation of a gel or insolubles. It is believed that it is the controlled reaction of low concentrations of gelatin with low concentrations of the bis-(vinyl sulfonyl) compounds of the invention to produce hydrolytically stable bonds which increases the molecular weight of the gelatin without loss of solubility.

The chain extended gelatins of the invention can be produced from any kind of parent gelatin including lime processed gelatin, acid processed bone gelatin, acid processed pigskin, and the like. Although acid processed gelatin is inherently a low molecular weight/low viscosity material, it can be used in the practice of the invention to provide a gelatin having the same molecular weight/viscosity as lime processed gelatin, without the disadvantages of alkaline extraction.

Lime processed and acid processed gelatins can be used as prepared or they can be deionized. Particularly in the case of acid processed gelatin, deionization removes excess salt produced in the process of making the gelatin.

Any suitable bis-(vinyl sulfonyl) compound can be used in the practice of the invention. Preferred classes of such suitable materials includes those having the formulae

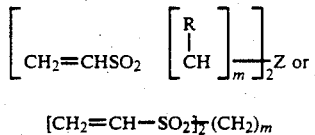

$$[CH_2=CH-SO_2]_{\overline{2}}(CH_2)_m$$

in which m is an integer of from 1 to 4, Z is a heteroatom such as oxygen, nitrogen, sulfur, and the like, and R is hydrogen or lower alkyl such as methyl, ethyl, isopropyl, butyl, pentyl, and the like which groups can, in turn, be further substituted. Preferred are bis-(vinyl sulfonyl) methane and bis-(vinyl sulfonyl methyl) ether.

The chain extending agents of the invention can be used in various kinds of gelatin photographic emulsions including orthochromatic, panchromatic, and infrared emulsions, as well as in X-ray and other nonoptically sensitized emulsions. They can be added to the emulsions before or after the addition of any optically sensitizing dyes which may be used, and are effective in sulfur and gold sensitized silver halide emulsions.

The chain extended gelatins of the invention can be used in bead coating and curtain coating operations or can otherwise be coated onto a wide variety of supports. Typical supports include those generally employed for photographic elements including cellulose nitrate film, cellulose acetate film, polyvinyl acetal film, polystyrene film, polyethylene terephthalate film, and related films or resinous materials as well as glass, paper, metal, wood, and the like. Supports such as paper that are coated with α-olefin polymers, particularly polymers of α-olefins containing two to 10 carbon atoms such as, for example, polyethylene, polypropylene, ethylene butene copolymers, and the like can be employed.

The gelatin compositions of the invention can also contain additional additives, particularly those known to be beneficial in photographic emulsions such as optical sensitizers, speed increasing materials, plasticizers, and the like, including those disclosed in U.S. Pat. No. 3,128,180 which is hereby incorporated herein by reference. Thus, the chain extended gelatin compositions of the invention can be used in photographic elements intended for color photography and can contain color-forming couplers or be used as emulsions to be developed by solutions containing couplers or other color generating materials or emulsions of the mixed packet type. Yellow coupler dispersions exhibit significantly smaller particle size than control dispersions prepared using standard viscosity gelatin.

Silver halides employed in photographic emulsions include any of the photographic silver halides such as silver bromide, silver iodide, silver chloride, silver chloroiodide, and the like. The silver halides used can be those which form latent images predominantly on the surface of the silver halide grains or those which form latent images inside the silver halide emulsion. Hardened emulsions of the gelatins of the invention can be used in diffusion transfer materials.

Although the chain extended gelatin compositions of the invention can be prepared from a gelatin solution containing from about 6% and about 18% (dry weight) gelatin, it is preferred that the gelatin concentration range from about 10% to about 15% by weight. Further, while the concentration of the chain extending agent ranges from about 0.25 to about 5 millimoles per 100 grams (dry weight) of gelatin, preferred amounts range from about 1 to about 3 millimoles per 100 grams of gelatin.

In the process of the invention, the gelatin solution containing the chain extending agent of the invention is heated at a temperature ranging from about 40° to about 60° C., preferably 40° to about 50° C., at a pH ranging from 4.5 and 7, preferably 5.4 to 6, for from about 1 to about 8 hours, preferably from about 2 to about 4 hours. The pH is monitored and adjusted at the beginning and the end of the process.

Any suitable apparatus or reactor can be used to carry out the chain extension reaction the invention, including any suitable stirring and heating means. Any suitable means available to those skilled in the art can be used to adjust the pH of the gelatin composition in accordance with the invention.

Photographic elements can be prepared using the chain extended gelatins of the invention. Suitable elements include a support such as a polyester or polyolefin film, a layer of the chain extended gelatin of the invention on the support, and any suitable hardener including those disclosed in any of the patents incorporated herein by reference.

The invention is further illustrated but is not intended to be limited by the following examples in which all parts and percentages are by weight unless otherwise indicated.

EXAMPLE 1

Lime Processed Bone Gelatin

About 7.6% (dry weight) of limed bone gelatin (the parent gelatin) was vigorously stirred for a few minutes in distilled water. Stirring was then stopped to avoid air entrainment and foaming and to allow the gelatin to swell for about thirty minutes. The gelatin mixture was then heated to 45° C. (+/−2°) to allow the gelatin to dissolve without stirring for about 20 minutes. The gelatin was then stirred mildly to avoid air entrainment and foaming for about thirty minutes, by which time all of the gelatin dissolved and the solution was uniform in consistency.

An aqueous solution of bis-(vinyl sulfonyl)methane was next added such that the gelatin solution contained 0.034% bis-(vinyl sulfonyl)methane which corresponds to 0.45% based on the dry weight of gelatin or 2.2 millimoles per 100 grams of gelatin. The solution was stirred vigorously for about two minutes to insure thorough mixing. The pH of the composition was adjusted to about 5.7 using either 1N sulfuric acid or 1N sodium hydroxide. Mixing speed was then reduced to very mild stirring which was continued for about three hours (+/− thirty minutes). The final product contains no gel or insolubles. It was stable on storage even under refrigeration until used.

An aqueous solution containing 7.6% of the parent lime processed bone gelatin was prepared under conditions as equal to those employed above as possible. Properties of the two solutions were compared. Viscosity measurements were made in a Brookfield LVTD viscometer using an ultra low viscosity adaptor thermostated at 40°+/−0.1° C. RBT measurements were made using a Rolling Ball Viscometer thermostated at 40°+/−0.01° C. Viscosity, setting time, and gel strength measurements were carried out at a gelatin concentration of 6.16 percent dry weight. Molecular weight distribution data were obtained from polyacrylamide gel electrophoresis measurements. Color and clarity were measured spectrophotometrically. Standard solution physical properties for both gelatins are given in Table 1.

Coatings were prepared from the chain extended gelatin of this example and the parent gelatin at the same dry gelatin coverage (1,000 mg/square foot), using the same added hardener (bis-(vinyl sulfonyl)—methyl) ether), at hardener concentrations of 1.5 and 3 weight percent based on the dry weight of gelatin in the solution (6.6 and 13.2 millimoles hardener per 100 grams of gelatin, respectively). Two different drying conditions were used, namely, mild and moderate drying conditions. In the mild drying condition the coatings were chill set at 50° F. followed by drying with air that had been conditioned to a dry bulb temperature of 85° F. and a wet bulb temperature of 55° F. In the moderate drying condition, the coatings were chill set at 50° F. followed by drying with air that was conditioned to yield a dry bulb temperature profile that increased from 92° to 100° F. and a wet bulb temperature profile which increased from 62° to 80° F. The physical properties of the chain extended gelatin coatings compared to those of the parent gelatin coatings were measured by performing the following testing protocols: vertical swell, lateral swell, and mushiness, all in 70° F. distilled water, wedge brittleness and raw film tackiness. Table 2 contains a summary of the results of these tests.

TABLE 1

| Physical Properties | Chain Extended | Parent |
|---|---|---|
| Viscosity at 6.16% | | |
| RBT seconds | 26.1 | 10.2 |
| Brookfield LVD, cp | 25 | 8.4 |
| Gel Strength, g | 256 | 278 |
| Setting Time, sec | 165 | 227 |
| pH | 5.6 | 5.7 |
| Color % | 53 | 59 |
| Clarity % | 85 | 91 |
| Molecular Weight Distribution | | |

TABLE 1-continued

| Physical Properties | Chain Extended | Parent |
|---|---|---|
| % Sub-alpha (<80K) | 35 | 29 |
| % Alpha (80K–150K) | 17 | 30 |
| % Beta (150K–250K) | 13 | 16 |
| % HMW (>250K) | 35 | 25 |

TABLE 2

| Gelatin | Parent | | | | Chain Extended | | | |
|---|---|---|---|---|---|---|---|---|
| % BVSME | 1.5 | 1.5 | 3 | 3 | 1.5 | 1.5 | 3 | 3 |
| Drying Condition | Mld | Mod | Mld | Mod | Mld | Mod | Mld | Mod |
| Vertical Swell % | 228 | 184 | 138 | 150 | 206 | 203 | 191 | 135 |
| Lateral Swell | 31 | 12 | 28 | 25 | 12 | 12 | 18 | 12 |
| % Mushiness (grams) | 112 | 174 | 138 | 200 | 100 | 184 | 105 | 200 |
| Wedge Brittleness (inches) | <.06 | <.006 | ← | <.06 | → | 0.11 | <.06 | .10 |
| Raw Film Tackiness | | | | | | | | |
| Sticking | 1 | 1 | 1 | 1 | 1 | 1 | 1 | 1 |
| Ferrotyping | 0 | 0 | 0 | 0 | 0 | 0 | 0 | 0 |

EXAMPLE 2

A chain extension process was carried out by reacting an aqueous 12.5 weight percent solution of a deionized acid processed bone gelatin with bis-(vinyl sulfonyl) methane at 40° C. and a pH of 5.7 for a period of six hours. In one reaction mixture the bis-(vinyl sulfonyl) methane concentration was 0.063 weight percent (0.5 percent based on the dry weight of gelatin or 2.55 millimoles per 100 grams gelatin). In a second reaction mixture the bis-(vinyl sulfonyl)methane concentration was 0.10 weight percent (0.80 percent based on the dry weight of gelatin or 4.1 millimoles per 100 grams gelatin. The physical properties of solutions of the parent gelatin and two chain extended gelatins prepared from the parent gelatin are reported in Table 3. Viscosity measurements were made in a Brookfield LVTD viscometer using an ultra low viscosity adaptor thermostated at 40°+/−0.02° C. RBT measurements were made using a Rolling Ball Viscometer thermostated at 40°+/−0.1° C. viscosity, setting time, and gel strength measurements were carried out at a gelatin concentration of 6.16 percent dry weight. Molecular weight distribution data were obtained from polyacrylamide gel electrophoresis measurements. Color and clarity were measured spectrophotometrically.

TABLE 3

| Physical Properties | Parent | Chain Extended | |
|---|---|---|---|
| % BVSM | 0 | 0.063 | 0.10 |
| Viscosity | | | |
| RBT seconds | 7.0 | 9.2 | 14.0 |
| Brookfield LVD, cp | 4.6 | 7.4 | 10.6 |
| Gel Strength, g | 343 | 349 | 336 |
| Setting Time, sec | 296 | 211 | 179 |
| pH | 5.7 | 5.5 | 5.5 |
| Color % | 52 | 50 | 49 |
| Clarity % | 83 | 81 | 81 |
| Molecular Weight Distribution | | | |
| % Sub-alpha (<80K) | 55.9 | 39.1 | 30.4 |
| % Alpha (80K–150K) | 16.1 | 14.5 | 11.5 |
| % Beta (150K–250K) | 10.9 | 13.6 | 12.2 |
| % HMW (>250K) | 17.2 | 32.8 | 45.9 |

Similar improvements are obtained when lime processed bone gelatin is used.

EXAMPLE 3

Three gelatin solutions were prepared, each of which had a low shear viscosity of 50 cp as measured in a Brookfield viscometer at 40° C. In solution (1) the gelatin used was a standard lime processed bone gelatin which has a viscosity of 12 cp measured at a gelatin concentration of 6.16% dry weight at a temperature of 40° C. In solution (2) the gelatin was a higher molecular weight lime processed bone gelatin having a viscosity of 20 cp measured at a gelatin concentration of 6.16% dry weight and 40° C. in solution (3) the gelatin was a chain extended gelatin prepared from the lime processed bone gelatin used in solution (1) and prepared by a process similar to that of Example 1. The chain extended gelatin had a viscosity of 23 cp as measured at a gelatin concentration of 6.16% dry weight and 40° C.

Curtain coating experiments were carried out using these three gelatin solutions. In the experiments, the maximum speed (Smax) attainable before the onset of air entrainment and the coating latitude were measured. The coating latitude was determined by measuring the speed at which air entrainment occurred as the flow rate of coating fluid through the coating hopper was increased. In Table 4, the Smax data measured in this experiment with these three coating fluids are reported. Although the measured Smax for the higher molecular weight gelatin and the chain extended gelatin solutions were the same in this experiment, the chain extended gelatin solutions exhibited superior coating latitude. For example, the chain extended gelatin solution maintained a constant Smax with increasing flow rate, the high molecular weight gelatin solution exhibited diminishing speed with increasing flow rate.

TABLE 4

| Gelatin | Curtain Height (inches) | Coating Solution Viscosity (cp) | Smax (fpm) |
| --- | --- | --- | --- |
| (1) Parent | 4.6 | 50 | 1050 |
| (2) High Molecular Weight Gelatin | 4.6 | 50 | 1300 |
| (3) Chain Extended Gelatin | 4.6 | 50 | 1300 |

Although the invention has been described in considerable detail in the foregoing it is to be understood that such detail is solely for the purpose of illustration and that variations can be made by those skilled in the art without departing from the spirit and scope of the invention except as set forth in the claims.

What is claimed is:

1. A soluble, chain extended gelatin comprising from about 0.25 to about 5 millimoles of a bis-(vinyl sulfonyl) compound per 100 grams of gelatin.

2. An aqueous composition containing from about 10% to about 15% of the chain extended gelatin of claim 1, based on the dry weight of gelatin divided by the total composition weight.

3. The chain extended gelatin of claim 1 containing from about 1 to about 3 millimoles of a bis-(vinyl sulfonyl) compound per 100 grams of gelatin.

4. The chain extended gelatin of claim 1 wherein the gelatin extended is acid processed bone gelatin.

5. The chain extended gelatin of claim 1 wherein the gelatin extended is lime processed bone gelatin.

6. The chain extended gelatin of claim 1 wherein the gelatin extended is acid processed pigskin.

7. An aqueous composition containing from about 6% to about 18% of the chain extended gelatin of claim 1, based on the dry weight of gelatin divided by the total composition weight.

8. A process for making the chain extended gelatin of claim 1 which comprises preparing a gelatin composition containing from about 6% to about 18% of gelatin, based on the dry weight of gelatin divided by the total composition weight, and from about 0.25 to about 5 millimoles of a bis-(vinyl sulfonyl) compound per 100 grams of gelatin, heating the composition at a temperature of from about 40° to about 60° C. and at a pH of from about 4.5 to 7 for from about one to about eight hours.

9. The process of claim 8 wherein the gelatin composition contains from about 10% to about 15% by weight of gelatin.

10. The process of claim 8 wherein the gelatin composition contains from about 1 to about 3 millimoles of a bis-(vinyl sulfonyl) compound per 100 grams of gelatin.

11. The process of claim 8 wherein the gelatin extended is selected from acid processed bone gelatin, lime processed bone gelatin, acid processed pigskin, and mixtures thereof.

12. The process of claim 8 wherein the gelatin composition is heated at a temperature of from about 40° to about 50° C.

13. The process of claim 8 wherein the pH of the gelatin composition is from about 5.4 to 6.

14. The process of claim 8 wherein the gelatin composition is heated for from about 2 to about 4 hours.

15. A photographic element comprising a support, a layer of the chain extended gelatin of claim 1, and a hardener.

16. A curtain coating composition containing the chain extended gelatin of claim 1.

17. A soluble, chain extended gelatin comprising from about 0.25 to about 5 millimoles per 100 grams of gelatin of a bis-(vinyl sulfonyl) compound having the formula

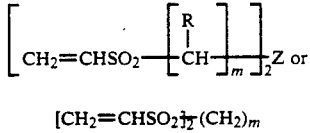

$$[CH_2=CHSO_2]_2(CH_2)_m$$

in which m is an integer of from 1 to 4, Z is a heteroatom and R is hydrogen or lower alkyl which can be further substituted.

18. The chain extended gelatin of claim 17 wherein the bis-(vinyl sulfonyl) compound is bis-(vinyl sulfonyl methyl) ether.

19. The chain extended gelatin of claim 17 wherein the bis-(vinyl sulfonyl) compound is bis-(vinyl sulfonyl) methane.

20. A process for making the chain extended gelatin of claim 17 which comprises preparing a gelatin solution containing from 6% to about 18% of gelatin, based on the dry weight of gelatin divided by the total gelatin solution weight, and from about 0.25 to about 5 millimoles of the bis-(vinyl sulfonyl) compound per 100 grams of gelatin, heating the composition at a temperature of from about 40° to about 60° C. and at a pH of from about 4.5 to about 7 for from about one to about eight hours.

21. The process of claim 20 wherein the bis-(vinyl sulfonyl) compound is bis-(vinyl sulfonyl methyl) ether.

22. The process of claim 20 wherein the bis-(vinyl sulfonyl) compound is bis-(vinyl sulfonyl) methane.

* * * * *